Jan. 14, 1930.  H. L. COOK  1,743,116
METHOD OF MAKING COLLETS
Filed Oct. 10, 1927
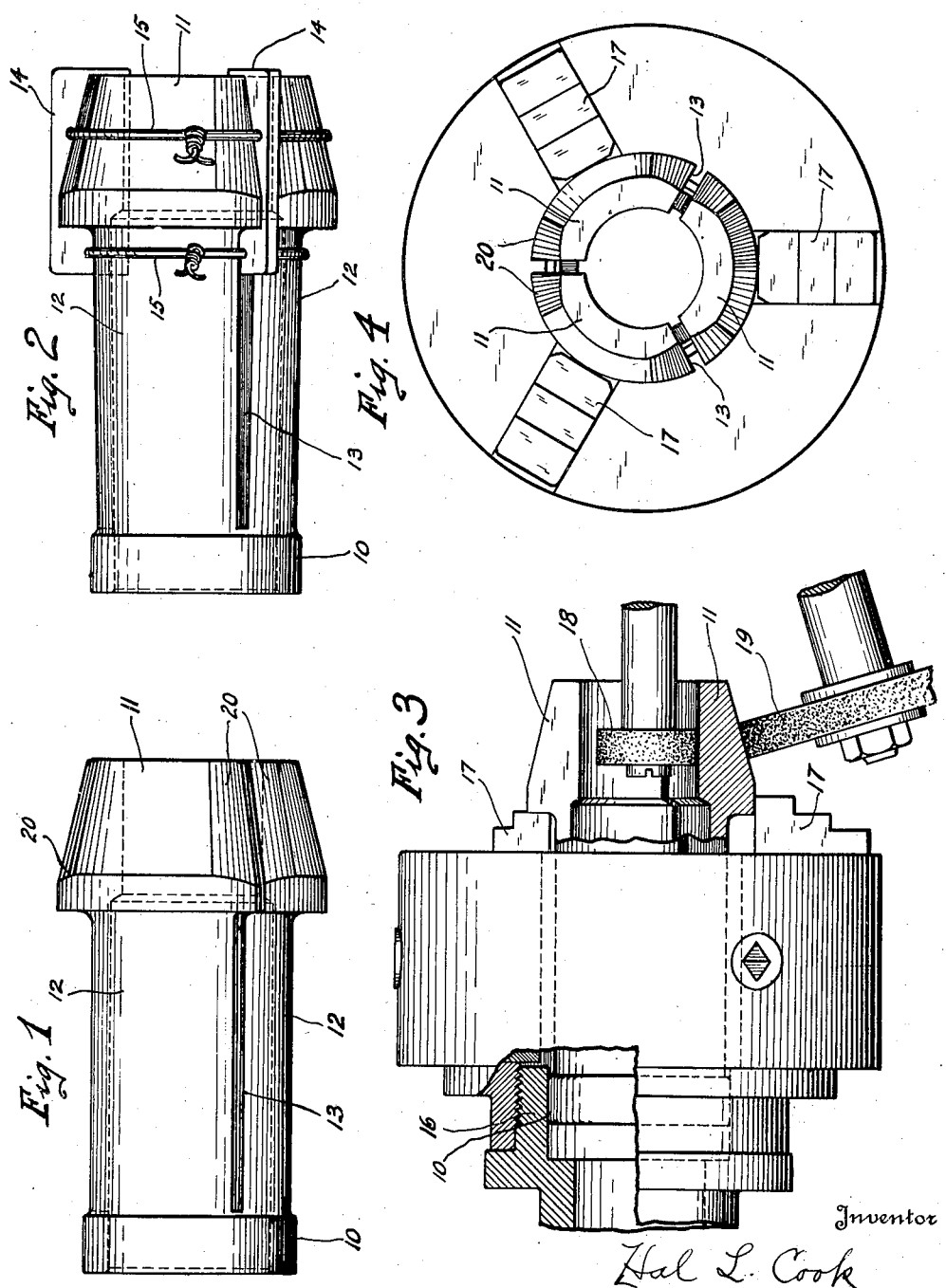
Inventor
Hal L. Cook
By Knox Hudson & Kent
Attorney Patented Jan. 14, 1930

1,743,116

UNITED STATES PATENT OFFICE

HAL L. COOK, OF CLEVELAND HEIGHTS, OHIO, ASSIGNOR TO THE WARNER & SWASEY COMPANY, OF CLEVELAND, OHIO, A CORPORATION OF OHIO

METHOD OF MAKING COLLETS

Application filed October 10, 1927. Serial No. 225,364.

This invention relates to a process of making spring collets for machine tools and has for its chief object to form the collet in such a way that it has greater accuracy than obtained by the prior methods employed in forming collets.

Heretofore, as the collets have been made, a great deal of difficulty has been encountered in forming the collets so that the work piece will be held central with respect to the spindle axis when the collet is tightened by the action of the tapered nose of the chuck which is adapted to force the jaws of the collet inward onto the work piece. This difficulty has been due in a large measure to the warping of the spring jaws in the heat treating or hardening process, and to the fact that the warping could not in most instances be obviated by subsequent machining or other treatment in finishing the collet.

By the present invention, the collets can be produced with uniform accuracy.

The invention may be briefly summarized as consisting in certain novel steps of the improved process hereinafter described and set forth in the appended claims.

In the accompanying sheet of drawings, illustrating the most important steps of the process, Fig. 1 shows in side elevation the finished collet; Fig. 2 is a similar view of a partially completed collet showing how the jaws of the collet are held in spread condition preparatory to the heat treatment and prior to the finishing of the collet; Fig. 3 shows the partially completed collet in a special chuck or fixture utilized for supporting the collet in order that the inner work gripping surfaces and outer tapered surfaces of the jaws may be ground from one setting; and Fig. 4 is an end view of the same looking toward the left of Fig. 3.

The collet illustrated is of the type wherein the jaws are compressed or forced inward by moving it outwardly into the tapered nose of the chuck, this collet being of the so-called "push out" type. Other slightly different collets of the so-called "draw back" type have the taper on the jaws of the collet and the taper on the nose of the chuck reversed with respect to the taper of the "push out" collet. My invention is applicable to either type of collet, but a collet of the "push out" type is shown and the same will serve as illustrative of both types since the invention is precisely the same when applied to the production of both types.

This collet is generally of cylindrical form. The body of the collet is usually a screw machine product formed from bar stock, and the finished collet has an annular heel 10 at its inner or rear end and a series of jaws 11, generally three in number, which jaws have outer faces tapered as illustrated in Fig. 1 when the collet is of the "push out" type, and reversely when it is of the "draw back" type. The jaws 11 are formed on the free ends of a series of arms 12 produced by longitudinally slotting the body from the forward end to substantially the heel 10, the slots being indicated at 13. The collet is hollow from end to end, the inner surfaces of the jaws 11 being for work gripping purposes and the remainder of the opening extending through the collet being somewhat larger in diameter and being for clearance purposes.

When the collet body is formed on a screw machine, it is of the form indicated in Fig. 1 except for the slots 13, and the body is subsequently slotted, generally by a milling process. Of course on the portions of the collet body which grip the work and by which the collet is adapted to be supported in a chuck, sufficient stock is provided for finishing purposes to be later described. Then the collet is made ready for the heat treating process in the manner indicated in Fig. 2, and to do this the jaws are somewhat spread or forced outwardly and are held in their outward position by spacers 14, and then the spacers and jaws are held in fixed relation preferably by wires 15, one of which is passed around the jaws through the spacers and tightened, and the other around the collet body at the rear of the jaws and also through the spacers, this wire also being tightened.

Then the collet prepared as illustrated in Fig. 2 is subjected to a suitable heat treating process for hardening. Then the collet is placed in a fixture not herein illustrated and the heel 10 is ground true with respect to the clearance bore extending forwardly from the rear end. The collet is then placed in a fixture such as illustrated in Figs. 3 and 4, (the other spacers 14 and the wires 15 having, of course, been previously removed), this fixture being in the nature of a chuck adapted to be rotated by a spindle and having a special rear end 16 which receives with a close fit the ground heel 10. Additionally, this chuck has radially movable jaws 17 which are adapted to engage the slotted body of the collet between the heel 10 and the jaws 11, as illustrated in Fig. 3. The jaws 17 of the chuck are moved inwardly so as to contract the jaws and arms 12 until the opposite walls of the slots 13 are substantially parallel, as prior to the heat treatment, it being understood that in the heat treatment the jaws are wedged apart, imparting an outward springing of the arms and during the heat treatment the arms of the collet have acquired a permanent set and after the spacers 14 are removed the arms retain the outwardly spring position. In the fixture, the jaws and arms are forced inwardly to substantially their original positions to allow enough stock on the inner surfaces of the jaws so that they can be ground to a true given or predetermined diameter. Then with the collet held in the chuck as explained above, the chuck is rotated and with one setting the inner and outer surfaces are ground, as by grinding wheels 18 and 19, to true concentric surfaces, the inner surface being cylindrical and the outer being tapered. This is accomplished in a standard form of grinding machine with the grinding wheels suitably held in a slide movable toward and from the rotating fixture.

By reason of the fact that the collet is held by the engagement of the ground heel with the portion 16 of the chuck, the heel is therefore centralized with the rotating spindle, and by reason of the fact that the inner and outer surfaces of the jaws are ground with the same setting of the collet, the surface of the heel and the inner and outer surfaces of the jaws become absolutely concentric, and since these are the only bearing surfaces which in the subsequent use of the collet are the collet and work supporting surfaces, the required accuracy and uniformity of accuracy in the production of any number of the collets are obtained.

Prior to the heat treatment the portions of the outer tapered surfaces of the jaws adjacent the slots 13 are machined off, as indicated at 20, so that in the finished collet there are true, arcuately curved portions at and adjacent the centers of the outer surfaces of the jaws for engagement with the tapered nose of the chuck in which the collet is to be employed.

The final step in the production of the collet is the grinding off of the rear end of the collet which is then held in a suitable fixture, not shown, in order that the rear end will be square with the cylindrical surface of the heel and therefore with the axis of the collet.

The above method or process, when carried out as herein explained, produces the results or objects stated in the earlier part of the specification, resulting in a superior product in so far as accuracy and uniformity of results are concerned. The advantages are attained by certain novel steps of the method set forth in the appended claims, it being understood that while I have explained the preferred method and have illustrated certain apparatus for carrying out some of the steps of the method, I am not to be confined to the particular means or apparatus illustrated nor to the precise steps described, but I aim in my claims to cover all modifications which do not involve a departure from the spirit and scope of the invention in its broadest aspects.

Having thus described my invention, I claim:

1. The method of making collets for machine tools which comprises displacing the spring jaws of the collet from normal position and surfacing the inner and outer surfaces of the spring jaws with one setting of the collet.

2. The method of finishing a collet body having spring arms with jaws which comprises supporting the body with the arms and jaws forced inwardly and with one setting surfacing the inner and outer surfaces of the jaws.

3. The method of finishing a collet body having spring arms and jaws at their free ends which comprises holding the body with its rear end concentric with an axis and surfacing the inner and outer surfaces of the jaws concentric to the same axis.

4. The method of finishing a collet body having spring arms and jaws at the free ends thereof which comprises holding the collet in a rotatable member with the jaws forced inward from normal position and with the rear end of the collet held concentric with respect to the axis of rotation and in one setting forming inner and outer surfaces concentric with the same axis.

5. The method of finishing a collet body having spring arms with jaws at the free ends thereof which comprises forming an annular surface on the rear end of the body, supporting the body in a rotatable fixture with the rear annular surface concentric with the axis of rotation and with the jaws forced inwardly beyond their normal position, and with said setting forming the inner and outer surfaces so that they are concentric with respect to the same axis, the outer surfaces being tapered.

6. The method of finishing a collet body having spring arms with jaws at the free ends thereof which comprises forming an annular surface on the rear end of the body, supporting the body in a rotatable fixture with the rear annular surface concentric with the axes of rotation and with the jaws forced inwardly beyond their normal position, and with said setting forming the inner and outer surfaces so that they are concentric with respect to the same axis, the outer surfaces being tapered, and relieving the outer surfaces of the jaws on opposite sides of the center line of each jaw.

7. The method of making a collet which comprises forming a collet body with arms having jaws at their free ends, heat treating the body with the jaws spread, forming an annular surface on the rear end of the collet, supporting the collet in a rotatable fixture with the jaws pressed inwardly beyond normal position and with the rear annular surface concentric with the axis of rotation, and while in said fixture forming concentric inner and outer surfaces on the jaws with the outer surface tapered.

In testimony whereof, I hereunto affix my signature.

HAL L. COOK.